United States Patent [19]

Lynam et al.

[11] Patent Number: 4,712,879
[45] Date of Patent: Dec. 15, 1987

[54] ELECTROCHROMIC MIRROR

[75] Inventors: Niall R. Lynam; Kiok K. Seah, both of Holland, Mich.

[73] Assignee: Donnelly Corporation, Holland, Mich.

[21] Appl. No.: 847,192

[22] Filed: Apr. 2, 1986

[51] Int. Cl.⁴ ............................. G02F 1/01; G02F 1/23
[52] U.S. Cl. ....................................... 350/357; 350/399
[58] Field of Search .................................. 350/357, 399

[56] References Cited

U.S. PATENT DOCUMENTS

| | | | |
|---|---|---|---|
| 28,199 | 10/1874 | Deb et al. | 350/357 |
| 3,280,701 | 10/1986 | Donnelly et al. | 350/357 |
| 3,453,038 | 7/1969 | Kissa et al. | 350/357 |
| 3,578,843 | 5/1971 | Castellion . | |
| 3,601,614 | 8/1971 | Platzer . | |
| 3,712,710 | 1/1973 | Castellion et al. . | |
| 3,840,286 | 10/1974 | Kiss . | |
| 3,862,798 | 1/1975 | Hopkins . | |
| 4,161,653 | 7/1979 | Bedini et al. . | |
| 4,181,406 | 1/1980 | Kohara et al. | 350/357 |
| 4,200,361 | 4/1980 | Malvano et al. . | |
| 4,309,082 | 1/1982 | Kohara et al. | 350/357 |
| 4,348,078 | 9/1982 | McIntyre | 350/357 |
| 4,350,414 | 9/1982 | Takahashi et al. | 350/357 |
| 4,433,901 | 2/1984 | Takahashi et al. | 350/357 |
| 4,448,488 | 5/1984 | Nakaho . | |
| 4,465,339 | 8/1984 | Bauche et al. | 350/357 |
| 4,482,216 | 11/1984 | Hashimoto et al. | 350/357 |
| 4,491,390 | 1/1985 | Tong-Shen | 350/331 R |
| 4,512,637 | 4/1985 | Ballmer | 350/357 |

FOREIGN PATENT DOCUMENTS

| | | |
|---|---|---|
| 53-010385 | 1/1978 | Japan . |
| 57-8524 | 1/1982 | Japan . |
| 58-048028 | 3/1983 | Japan . |
| 58-44422 | 3/1983 | Japan . |
| 58-114021 | 7/1983 | Japan . |
| 58-114020 | 7/1983 | Japan . |
| 58-114019 | 7/1983 | Japan . |
| 58-184129 | 10/1983 | Japan . |
| 57-172269 | 4/1984 | Japan . |
| 59-61821 | 4/1984 | Japan . |
| 0113421 | 6/1984 | Japan . |
| 59-61820 | 11/1984 | Japan . |
| 2086601 | 10/1981 | United Kingdom . |
| 2100875 | 6/1982 | United Kingdom . |

*Primary Examiner*—Eugene R. LaRoche
*Assistant Examiner*—Nathan W. McCutcheon
*Attorney, Agent, or Firm*—Price, Heneveld, Cooper, DeWitt & Litton

[57] ABSTRACT

The specification discloses an electrochromic mirror including a glass substrate, an anodic nickel hydroxide layer 300 to 600 angstroms thick, a solid electrolyte layer 1000 to 1500 angstroms thick, a cathodic tungsten oxide layer 600 to 1200 angstroms thick and a layer of reflective/conductive material.

20 Claims, 2 Drawing Figures

ELECTROCHROMIC MIRROR

BACKGROUND OF THE INVENTION

The present invention relates to vehicle rearview mirrors. One problem with rearview mirrors is that they can be very annoying at night. The lights of a following car can be blinding when they reflect into the driver's eyes from the rearview mirror.

With respect to interior mirrors, a common commercial solution to this problem is to utilize a prism mirror which can be mechanically shifted from a day position wherein one receives the maximum reflection of light entering the mirror to a night position where one sees only a small fraction of the light entering the mirror.

Studies show that in daylight, the mirror must have an image brightness of about 35%. Since tinted back windows usually transmit about 70% of the incident light, the interior mirror must reflect at least 50% of the incident light. Even this is unsatisfactory in terms of consumer acceptance. It is generally felt that consumer acceptance requires that the interior mirror have a reflectance of 60-70% in the daylight mode. In contrast for the night mode, interior mirror reflectance is preferably less than about 10%.[1]

[1] Reflectance as used throughout refers to the percentage of incident light reflected as measured by the Society of Automotive Engineers Test SAEJ964A.

One problem with mechanically shiftable prism mirrors is that slight adjustments of the mirror position, either accidentally or intentionally, can result in a complete change in the reflectivity which the driver sees. Following such adjustments, the driver must again shift the mechanical mechanism to change the mode of the mirror.

Another problem with such mirrors is that if they are not adjusted just right, one sees the ghosts of objects or people in the backseat in the rearview mirror at the same time one sees the lights of a following car. This can be disconcerting.

With exterior mirrors, the prismatic solution does not work. No solution to the problem is commercially available. Often, drivers simply adjust the outside rearview mirrors to an inoperative position. This is especially unsafe in the case of vehicles having no interior mirror.

It has been suggested that, in order to obviate the above problems, it would be desirable to darken a mirror electro-optically. By applying a charge to a liquid crystal rearview mirror, one could immediately darken the mirror to a night driving mode. However, the use of a liquid crystal device as a rearview mirror has a number of significant drawbacks, not the least of which is excessive cost.

A liquid crystal mirror is too dark in the daylight mode, e.g., around 50% and are too reflective in night mode, e.g., around 15%. A liquid crystal device would require two pieces of glass which, in addition to being costly, could cause the driver to see double images. Also, it is extremely difficult to make a double glass liquid crystal mirror shatterproof. Any breakage of the seal of the liquid crystal would result in material oozing out of the mirror. Further, it would be extremely difficult to make a liquid crystal mirror in a concave or convex configuration as is often desired for rearview mirrors.

If one employed some type of automatic light sensing system to control the liquid crystal mirror, one would encounter "flickering". As a photocell sensed the lights of a following car, it would apply a voltage to the liquid crystal device which would immediately trigger it to its darkened state. As the car passed, the mirror would immediately flip back to its more reflective mode.

It has been suggested that such drawbacks could be overcome by darkening a mirror electrochromically in response to night driving conditions, using solid state electrochromic materials. Electrochromism involves the use of layers of electrochromic material which darken in response to an applied voltage. Persistent electrochromic materials stay darkened in response to an initial voltage input. They then lighten again in response to a neutralizing voltaic input. The extent of darkening and lightening can be variably controlled in response to variable input from a light sensor, this eliminating any flickering problem.

Unfortunately, such electrochromic mirrors heretofore developed have been either too dark in the daylight, i.e., reflecting less than 70% of incident light, or have been too reflective at night, i.e., reflecting more than 10% of incident light. Also, such mirrors have been too slow in shifting from one mode to the other. This is extremely annoying to the driver who wants to be able to adjust his mirror instantly from daylight to night mode or from night to daylight mode.

Some electrochromic mirror suggestions have involved the use of extremely reactive reflective materials, such as alkali metals. These are extremely dangerous to work with and are difficult to protect environmentally in an automobile. Others have involved the use of very expensive materials. Some electrochromic devices also use two pieces of glass and thus suffer the same shattering and convex fabrication problems discussed above for liquid crystal mirrors.

It is probably for these reasons that to date, there are no commercially available electrochromic rearview mirrors.

SUMMARY OF THE INVENTION

The present invention comprises an electrochromic mirror which, in the different aspects of the invention, solves the foregoing problems. The problems of shifting speed and reflectivity spread between the night and daylight modes is solved by using, in the order indicated, a glass substrate, a conductive coating thereon, a layer of nickel hydroxide from 300 to 600 angstroms, and most preferably about 400 angstroms thick, a solid electrolyte layer, most preferably tantalum oxide, from about 1000 to about 1500 angstroms, and most preferably about 1300 angstroms thick, a layer of tungsten oxide from about 600 to about 1200 angstroms and most preferably 800 angstroms thick, and an aluminum reflective and conductive layer. In the broadest aspects of the invention, the nickel hydroxide and tungsten oxide can be reversed, but the above order as stated is surprisingly preferable. Light passes first through the glass substrate, then through the various other layers until it is reflected by the aluminum layer and passes back out through the foregoing layers.

This arrangement provides a mirror which will shift very rapidly from the night mode to the day mode, i.e., in about one to three seconds. Further, in the daylight mode the mirror reflects about 70% of the entering light and in the night mode reflects less than about 10% of the incident light.

These and other objects and advantages of the invention will be more fully understood and appreciated by reference to the written specification and appended drawings.

DESCRIPTION OF THE PREFERRED EMBODIMENT

Figure 1:
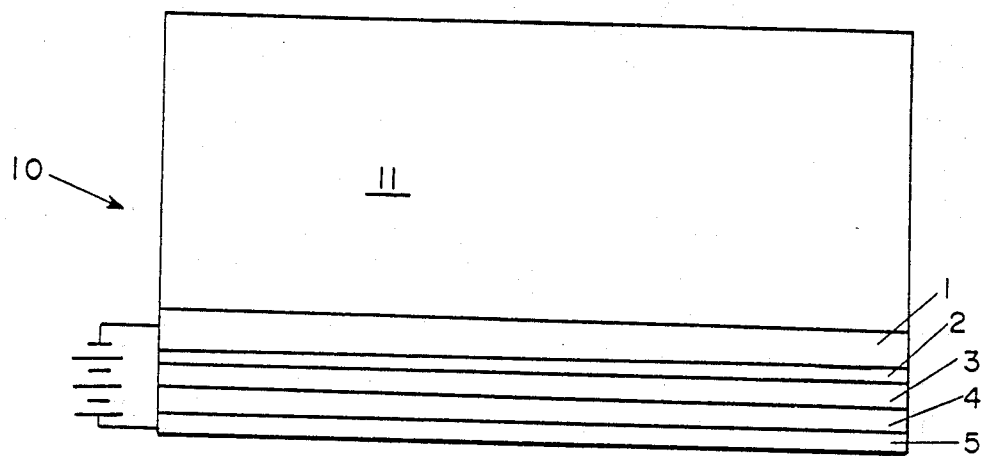
FIG. 1 is a schematic representation of a cross section of a mirror made in accordance with the present invention.

The preferred embodiment of the present invention is an electrochromic mirror comprising a plurality of solid state thin films deposited onto a single piece of glass 11 (FIG. 1). Neither the thickness nor type of glass used is critical. A typical glass substrate will be conventional soda glass at a thickness of from about one millimeter to about three millimeters. Use of a single piece of glass 11 greatly eases shatterproofing and convex fabrication problems discussed above.

The first layer deposited on glass substrate 11 is conductive layer 1. Conductive layer 1 can be of any conventional electroconductive coating, such as indium-tin oxide, tin oxide or cadmium stannate. The thickness of this layer is not critical, so long as it adequately conducts electricity across its entire surface. Also, its thickness should be selected so that the transmission of light through the electroconductive layer is maximized. In this regard, it is convenient to work with half wavelength or full wavelength optical thicknesses of the median wavelength for visible light (5500 angstroms). Optical thickness is physical thickness multiplied by the index of refraction of the material. In the case of indium-tin oxide, the index of refraction is about 1.7. Hence, an indium-tin oxide layer preferably has a thickness of approximately 1600 angstroms. This is about one-half wavelength in optical thickness (1600 × 1.7 = 2720). It is sufficiently thick to provide excellent conductivity (sheet resistance typically 10-15 ohms/square) across its entire surface and yet is sufficiently thin that it does not excessively darken the mirror.

The second layer applied is a nickel hydroxide electrochromic layer 2. Nickel hydroxide is an anodic electrochromic material in that it colors when electrically connected to a positive electrode. The thickness of the nickel hydroxide layer is critical. If it is too thick, the mirror will have low reflectivity. The nickel hydroxide layer will give the mirror a constant brownish cast. The mirror will be too dark for normal daylight use. Further, the mirror will be too slow in changing from daylight mode to night mode and visa versa.

On the other hand if the nickel hydroxide layer is too thin, the mirror will not darken sufficiently during nighttime conditions as a following car approaches. We have found that the nickel hydroxide layer must be from about 300 to about 600 angstroms thick. Most preferably, the nickel hydroxide layer is 400 angstroms thick.

The term "nickel hydroxide" as used herein must of course be understood to encompass variations from stoichiometrically pure Ni(OH)$_2$. Those skilled in the art will appreciate that the starting material for applying the nickel hydroxide layer is nickel oxide which, as explained below, is then hydrated to nickel hydroxide. It is not known whether such hydration ever becomes stoichiometrically complete.

The next layer applied to the mirror stack is a solid electrolytic layer 3. This layer serves to isolate the anodic and cathodic electrochromic layers. As such, it must be ion conducting, electron insulating, clear and must remain clear during bleaching of the electrochromic layers. Suitable materials include tantalum pentoxide, cesium oxide, aluminum oxide, magnesium fluoride, silicon dioxide and mixtures thereof. Tantalum pentoxide is the most preferred material. The thickness of this layer is also critical. If too thick, the mirror does not shift between daylight and night modes rapidly enough. If this layer is too thin, the mirror will have too great a tendency to discharge from its colored to an uncolored state. We have found that the solid electrolyte layer must have a thickness of from about 1000 to about 1500 angstroms, and most preferably 1300 angstroms.

Electrochromic layer 4 is a cathodic electrochromic material comprising tungsten oxide. Cathodic electrochromic materials are those which color when connected to a negative electrode. Thus when the mirror stack is subjected to an appropriate potential difference, both the nickel hydroxide and tungsten oxide layers will color. When that potential is reversed, both layers will clear.

The thickness of the tungsten oxide layer is also critical. If too thick, the mirror will respond too slowly to changes in light and will always be too dark. Daylight reflectivity will not be sufficient. If the layer is too thin, the mirror will not color sufficiently for nighttime conditions. We have found that the tungsten oxide layer should be from about 600 to about 1200 angstroms, and most preferably 800 angstroms.

Finally, an aluminum conductive and reflective layer 5 is applied. It is important only that this layer be sufficiently thick that it conducts readily over its entire surface and cannot be easily damaged. The aluminum layer serves both to reflect incident light and to conduct electricity to the tungsten oxide electrochromic layer. We have found that a thickness of from about 500 to about 1500 angstroms is adequate. The most preferable aluminum layer thickness appears to be about 1000 angstroms.

It is preferable that the nickel hydroxide layer be deposited ahead of the tungsten oxide layer in order of exposure to incident light. If deposited in that order, the mirror of the present invention will, in its uncolored state, reflect in excess of 70% of the incident light. In the colored state, it will reflect less than 10% of the incident light.

In contrast if the tungsten oxide layer were deposited in front of the nickel hydroxide layer in order of exposure to incident light, the mirror, with the preferred layer thicknesses will reflect no more than about 60% of the incident light in its uncolored state. Altering layer thicknesses to increase reflectivity in the uncolored state results in the mirror reflecting too much light in its colored state.

The half reactions which lead to the coloring and bleaching of the mirror stack are illustrated below:

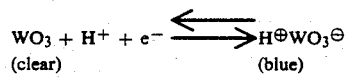

$$WO_3 + H^+ + e^- \rightleftharpoons H^\oplus WO_3^\ominus$$
(clear) (blue)

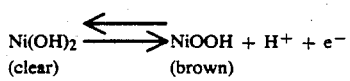

$$Ni(OH)_2 \rightleftharpoons NiOOH + H^+ + e^-$$
(clear) (brown)

The liberated electron is drawn through the power circuit to which the two electrodes are connected. The liberated hydrogen ion migrates through the ion permeable, solid electrolyte layer.

The various layers 1–5 in the mirror stack of the present invention can be deposited in any conventional manner. Different deposition methods can be employed for different layers. Such techniques are well-known to those skilled in the art for all of the materials used in the present invention.

Common modes of fabrication of the electrochromically active layers 2 and 4, and electrolyte insulating layer 3, include evaporation and sputter deposition. The starting materials include high purity tungsten oxide, nickel oxide and tantalum pentoxide. The availability of moisture during the manufacturing process is critical to ultimate device performance in order to facilitate conversion of the nickel oxide to nickel hydroxide. We find it beneficial to fabricate the mirrors in an environment of at least 30% relative humidity. We find it beneficial to purposely introduce controlled amounts of moisture into the vacuum chamber during deposition of the tungsten oxide, tantalum pentoxide and nickel oxide layers.

We also find it beneficial to operate the vacuum deposition chamber at as high a pressure as can be tolerated in order to render layers 2, 3 and 4 somewhat porous in order that ion injection, ejection and transmission is rapid. For example in evaporation coating, we find that backfilling the deposition chamber to a partial pressure of about $10^{-4}$ torr sufficiently reduces mean free path that the desired porous coatings are obtained.

EXPERIMENTAL RESULTS

Figure 2:
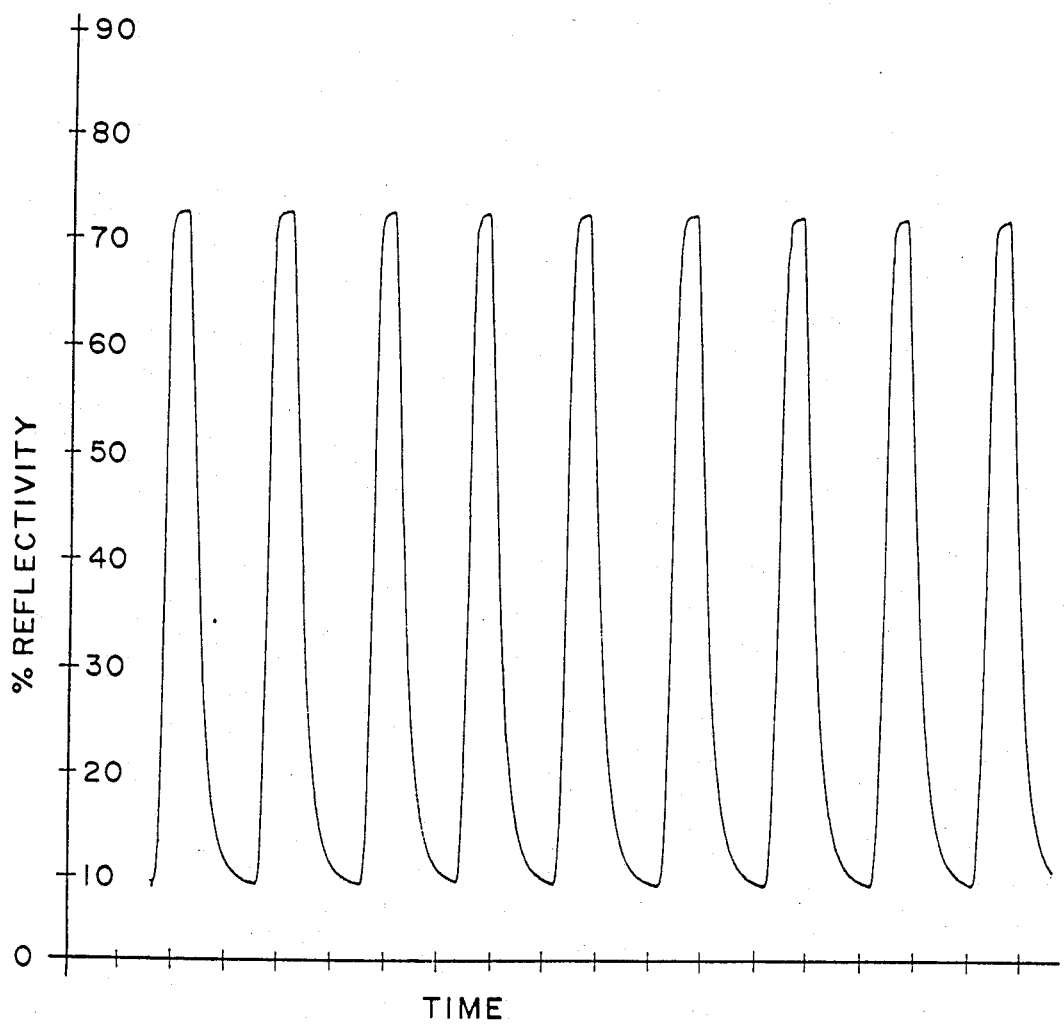
FIG. 2 is a chart readout of the mirror reflectivity as it is cycled between its modes.

Mirrors made in accordance with the present invention were tested for speed of response to changes in potential, reflectivity at potential extremes and durability through repeated cycling. The mirror in its uncolored state was subjected to a potential difference and the change in reflectivity was charted. In one second, the mirror was discharged and again, the change in reflectivity charted. A typical chart readout is illustrated in FIG. 2.

The foregoing cycle was repeated over 100,000 times. It was found that the mirror made in accordance with the present invention cycled from a reflectivity of in excess of 70% to a reflectivity of less than 10% in one to three seconds. This pattern continued through all 100,000 plus cycles.

Of course, it is understood that the foregoing is merely a preferred embodiment of the invention and that various changes and alterations can be made without departing from the spirit and broader aspects thereof.

The embodiments of the invention in which an exclusive property or privilege is claimed are defined as follows.

1. An electrochromic vehicle mirror which can be alternatively darkened or lightened to decrease or increase reflectivity comprising in the order indicated:
   a glass substrate;
   a conductive coating thereon; one of an anodic electrochromic layer of nickel hydroxide and a cathodic electrochromic layer of tungsten oxide;
   a solid electrolyte layer;
   the other of said cathodic electrochromic layer and said anodic electrochromic layer; and
   a layer of a reflective/conductive material;
   where said anodic nickel hydroxide electrochromic layer has a thickness of from about 300 to about 600 angstroms, said solid electrolyte layer has a thickness of from about 1000 to about 1500 angstroms and said cathodic tungsten oxide electrochromic layer has a thickness of from about 600 to about 1200 angstroms.

2. The mirror of claim 1 in which said anodic layer has a thickness of about 400 angstroms, said solid electrolyte layer has a thickness of about 1300 angstroms and said cathodic electrochromic layer has a thickness of about 800 angstroms.

3. The mirror of claim 2 in which said nickel hydroxide layer is deposited before said tungsten oxide layer.

4. The mirror of claim 3 in which said conductive layer which is adjacent said glass substrate is indium-tin oxide.

5. The mirror of claim 4 in which said indium-tin oxide layer has a thickness of about 1600 angstroms.

6. The mirror of claim 5 in which said conductive/reflective layer is metallic aluminum.

7. The mirror of claim 6 in which said aluminum layer is from about 500 to about 1500 angstroms thick.

8. The mirror of claim 7 which has no glass layer other than said glass substrate.

9. The mirror of claim 8 in which each of said nickel hydroxide, tungsten oxide and solid electrolyte layers is sufficiently porous to effect rapid injection, ejection and transmission of ions.

10. The mirror of claim 9 in which said nickel hydroxide, solid electrolyte and tungsten oxide layers are deposited in partial vacuums in which back pressure is kept as high as possible without disrupting deposition.

11. The mirror of claim 10 in which said solid electrolyte layer is selected from the group consisting of: tantalum pentoxide, cesium oxide, aluminum oxide, magnesium fluoride, silicon dioxide and mixtures thereof.

12. The mirror of claim 11 in which said solid electrolyte is tantalum pentoxide.

13. The mirror of claim 1 in which said nickel hydroxide layer is deposited before said tungsten oxide layer.

14. The mirror of claim 13 in which each of said nickel hydroxide, tungsten oxide and solid electrolyte layers is sufficiently porous to effect rapid injection, ejection and transmission of ions.

15. The mirror of claim 14 in which said nickel hydroxide, solid electrolyte and tungsten oxide layers are deposited in partial vacuums in which back pressure is kept as high as possible without disrupting deposition.

16. The mirror of claim 13 which has no glass layer other than said glass substrate.

17. The mirror of claim 1 in which each of said nickel hydroxide, tungsten oxide and solid electrolyte layers is sufficiently porous to effect rapid injection, ejection and transmission of ions.

18. The mirror of claim 17 in which said nickel hydroxide, solid electrolyte and tungsten oxide layers are deposited in partial vacuums in which back pressure is kept as high as possible without disrupting deposition.

19. The mirror of claim 1 in which said solid electrolyte layer is selected from the group consisting of: tantalum pentoxide, cesium oxide, aluminum oxide, magnesium fluoride, silicon dioxide and mixtures thereof.

20. The mirror of claim 19 in which said solid electrolyte is tantalum pentoxide.

* * * * *